(12) United States Patent
Tiller et al.

(10) Patent No.: US 8,426,014 B2
(45) Date of Patent: *Apr. 23, 2013

(54) MODIFIED MARKING BASED ON CHIRAL LIQUID CRYSTAL POLYMERS

(75) Inventors: Thomas Tiller, Bussigny (CH); Frédéric Gremaud, Epagny (CH); Andrea Callegari, Chavannes-près-Renens (CH); Olivier Rozumek, Le Pâquier-Montbarry (CH); Brahim Kerkar, Pully (CH)

(73) Assignee: Sicpa Holding SA, Prilly (CH)

( * ) Notice: Subject to any disclaimer, the term of this patent is extended or adjusted under 35 U.S.C. 154(b) by 367 days.

This patent is subject to a terminal disclaimer.

(21) Appl. No.: 12/783,088

(22) Filed: May 19, 2010

(65) Prior Publication Data

US 2011/0135853 A1 Jun. 9, 2011

Related U.S. Application Data

(60) Provisional application No. 61/267,654, filed on Dec. 8, 2009.

(51) Int. Cl.
| | | |
|---|---|---|
| *B41M 3/14* | (2006.01) | |
| *B41M 5/28* | (2006.01) | |
| *B42D 15/10* | (2006.01) | |
| *C09K 19/52* | (2006.01) | |
| *C09K 19/58* | (2006.01) | |
| *C09K 19/38* | (2006.01) | |
| *G06K 7/10* | (2006.01) | |
| *B41J 2/00* | (2006.01) | |

(52) U.S. Cl.
USPC .... 428/195.1; 428/1.6; 428/199; 252/299.01; 252/299.5; 283/72; 283/74; 427/7; 235/454; 235/462.01; 347/110

(58) Field of Classification Search ............... 428/195.1, 428/199, 1.6; 252/299.01, 299.5; 283/74, 283/72; 235/454, 462.01; 347/110; 427/7
See application file for complete search history.

(56) References Cited

U.S. PATENT DOCUMENTS

| | | |
|---|---|---|
| 6,207,240 B1 | 3/2001 | Schoenfeld et al. |
| 7,540,421 B2 | 6/2009 | Pinchen et al. |
| 2003/0052305 A1 | 3/2003 | Coates et al. |
| 2006/0257633 A1 | 11/2006 | Inoue et al. |
| 2007/0200091 A1 | 8/2007 | Pinchen et al. |
| 2007/0224341 A1 | 9/2007 | Kuntz et al. |
| 2009/0174914 A1 | 7/2009 | Pinchen et al. |
| 2011/0135853 A1* | 6/2011 | Tiller et al. ..................... 428/29 |
| 2011/0135890 A1* | 6/2011 | Tiller et al. ................ 428/195.1 |

FOREIGN PATENT DOCUMENTS

| | | |
|---|---|---|
| GB | 2457911 A | 9/2009 |
| JP | 2009-300662 A | 12/2009 |
| WO | 03/049047 A | 6/2003 |
| WO | 2005/049703 A | 6/2005 |
| WO | 2006/118889 A | 11/2006 |
| WO | 2009/121605 A | 10/2009 |

OTHER PUBLICATIONS

M. Barón, *Pure Appl. Chem.*, 2001, vol. 73, No. 5, pp. 845-895.
English language translation of JP 2009-300662.

* cited by examiner

*Primary Examiner* — Shean C Wu

(74) *Attorney, Agent, or Firm* — Greenblum and Bernstein, P.L.C.

(57) ABSTRACT

A liquid crystal polymer marking is obtainable by a process that comprises applying a chiral liquid crystal precursor composition onto a substrate, heating the composition to a chiral liquid crystal state, applying to at least one area of the precursor composition a modifying composition, if necessary, heating the at least one area to bring same to a modified liquid crystal state, and subsequently curing and/or polymerizing the resultant product. This abstract is neither intended to define the invention disclosed in this specification nor intended to limit the scope of the invention in any way.

30 Claims, 1 Drawing Sheet

MODIFIED MARKING BASED ON CHIRAL LIQUID CRYSTAL POLYMERS

CROSS-REFERENCE TO RELATED APPLICATIONS

The present application claims the benefit under 35 U.S.C. §119(e) of U.S. Provisional Application No. 61/267,654, filed Dec. 8, 2009, the entire disclosure of which is expressly incorporated by reference herein.

BACKGROUND OF THE INVENTION

1. Field of the Invention

The present invention relates to a marking based on chiral nematic (also called cholesteric) liquid crystal polymers. The invention also relates to a method for the modification of chiral nematic liquid-crystal films, in which a chiral nematic liquid-crystal layer is locally or selectively (one or more region(s)) modified with the aid of a modifying composition.

2. Discussion of Background Information

According to a report published by the United Nations Economic Commission for Europe in 2007 the increasing presence of counterfeit goods on the market is costing governments and legitimate traders billions of dollars annually in lost revenues. In addition to the economic impact, counterfeit products or goods with counterfeit conformity assessment marks can also represent serious health and safety problems. Such products may include adulterated or contaminated food, hazardous toys, falsified electrical goods and spare parts for cars. The World Health Organization has identified counterfeit medicines as an enormous threat to health, potentially causing serious harm to patients and sometimes leading to death.

A classic way to protect products or goods from counterfeit is to mark them with a unique identifier. The marking can be in the form of, for example, a code, indicia or a data matrix. Several patent applications relate to marking and apparatus for authenticating them. For example, WO 2003/049047, the entire disclosure of which is incorporated by reference herein, describes a method and apparatus for applying unique composite indicia or makings to a succession of articles, in which each unique composite indicium comprises two or more indicia. At least part of each of the indicia may be co-located at a predetermined location on the article with such co-location being unique or distinct for each composite indicium for each article. The indicium may be overprinted with one or more images, logos or colour-schemes. A code (e.g. an alphanumeric code) that is stored in a database may be derived from the composite indicium from one or more mathematical properties. The code may be later accessed for identifying or verifying the article with indicium. WO 2006/118889, the entire disclosure of which is incorporated by reference herein, relates to an article including a chemiluminescent substance. This document further relates to methods and a device which detect the presence of chemiluminescence for purposes of communicating information associated with the article. Useful applications of the invention include confirmation of the authenticity of an article or its contents, or conversely forgery detection. The method according to the invention relates to an information step providing visible indicia. WO 2009/121605, the entire disclosure of which is incorporated by reference herein, discloses a marking of polymeric liquid crystal material having predetermined optical characteristics allowing its authentication and reading by a machine and its authentication by the human eye. The marking is applied onto an item, good or article. The marking is in the form of indicia representing a unique code which allows for an easy authentication by the human eye and a secure tracking and tracing of the marked item, good or article throughout is life cycle.

Even if the cited methods seem reliable and efficient to protect goods or articles from counterfeiting, it is a fact that counterfeiters use increasingly sophisticated tools to copy and/or replicate an indicium or a marking. This is particularly true when combined with rapidly improving printing technologies such ink-jet, laser techniques etc. There is therefore still a need to create a more sophisticated system having many more chemical and coding permutations than are currently available, without sacrificing the reliability, the ease of use, the ease of production, the ease of detection, the cost of production and authentication.

Thus, it would be advantageous to have available new methods and new markings for tracking and/or authenticating articles using a marking that is easy to apply, detect, read, and decode by an authorized user, and yet possesses a multiple level of coding so as to be extremely difficult to replicate or copy by an unauthorized user or counterfeiter.

SUMMARY OF THE INVENTION

The present invention provides a liquid crystal polymer marking. The marking is obtainable by a process which comprises:
(i) applying a first chiral liquid crystal precursor composition onto at least one surface of a (solid) substrate;
(ii) heating the applied composition to bring same to a first chiral liquid crystal state;
(iii) applying to one or more areas of the applied composition at least one of:
    (1) at least one modifying composition which modifies the first chiral liquid crystal state locally in the one or more areas, and
    (2) at least one modifying composition which upon heating modifies the first chiral liquid crystal state locally in the one or more areas;
(iv) in the case of (2), heating at least one of the one or more areas to bring same to at least one of a second chiral liquid crystal state and an isotropic state; and
(v) at least one of curing and polymerizing the thus locally modified precursor composition to convert same into a liquid crystal polymer marking.

In one aspect of the marking of the present invention, the at least one modifying composition may at least partially convert the first chiral liquid crystal state into a (predominantly or substantially) isotropic state. In another aspect, the at least one modifying composition may at least partially convert the first chiral liquid crystal state into a second chiral liquid crystal state that is different from the first state. In another aspect, in stage (iii) at least two or at least three different modifying compositions are applied simultaneously or consecutively.

In another aspect, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

In yet another aspect of the marking of the present invention, the chiral liquid crystal precursor composition may comprise at least one chiral dopant compound B of formula (I):

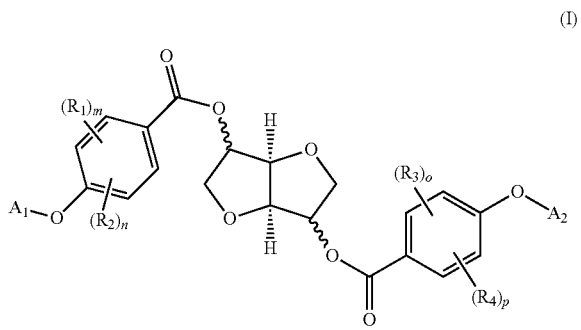

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):
(i) $-[(CH_2)_y-O]_z-C(O)-CH=CH_2$;
(ii) $-C(O)-D_1-O-[(CH_2)_y-O]_z-C(O)-CH=CH_2$;
(iii) $-C(O)-D_2-O-[(CH_2)_y-O]_z-C(O)-CH=CH_2$;
$D_1$ denotes a group of formula

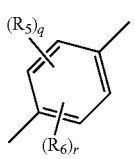

$D_2$ denotes a group of formula

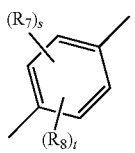

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In a still further aspect of the marking of the present invention, the at least one modifying composition may comprise at least one compound that is selected from ketones having from 3 to about 6 carbon atoms (e.g., 3, 4, 5 or 6 carbon atoms), alkyl esters and dialkylamides of carboxylic acids which comprise a total of from 2 to about 6 carbon atoms (e.g., 2, 3, 4, 5 or 6 carbon atoms), dialkyl sulfoxides comprising a total of from 2 to about 4 carbon atoms (e.g., 2, 3 or 4 carbon atoms), and optionally substituted nitrobenzene. For example, the at least one modifying agent may comprise at least one of dimethyl ketone, methyl ethyl ketone, ethyl acetate, dimethyl formamide, dimethyl sulfoxide, and nitrobenzene.

In another aspect of the marking of the present invention, the at least one modifying composition may comprise a second chiral liquid crystal precursor composition. The first chiral liquid crystal precursor composition and the second chiral liquid crystal precursor composition may be identical. Alternatively, the first and second chiral liquid crystal precursor compositions may be different from each other. For example, the second chiral liquid crystal precursor composition may differ from the first chiral liquid crystal precursor composition at least in that the second composition comprises at least one of the one or more chiral dopant compounds B in a concentration which is different from a concentration of the same chiral dopant compound in the first composition and/or at least in that the second composition comprises at least one chiral dopant compound B which is different from any of the one of the one or more chiral dopant compounds B that are present in the first composition.

In yet another aspect of the marking of the present invention, the at least one modifying composition may comprise a chiral dopant composition. The chiral dopant composition may comprise, for example, at least one chiral dopant compound C which is a compound of formula (I) as set forth above. In another aspect, the chiral dopant composition may further comprise at least one chiral dopant compound D which is different from a compound of formula (I).

In another aspect of the instant marking, the modifying composition may further comprise at least one resin and/or at least one salt and/or at least one pigment and/or dye that absorbs in the visible or invisible region of the electromagnetic spectrum and/or at least one luminescent pigment and/or dye.

In another aspect of the marking of the present invention, stage (ii) of the process may comprise a heating of the applied composition to a temperature of from about 55° C. to about 150° C., e.g., from about 55° C. to about 100° C., or from about 60° C. to about 100° C.

In a still further aspect, stage (iii) of the process may comprise an application (e.g., deposition) of the at least one modifying composition by continuous ink-jet printing and/or drop-on-demand ink-jet printing and/or spray coating and/or valve-jet printing.

In another aspect, immediately after stage (iii) of the process a stream of air may be passed over the surface of the one or more areas, preferably (substantially) parallel thereto.

In yet another aspect, the marking of the present invention may be in the form of at least one of an image, a picture, a logo, indicia, or a pattern representing a code selected from one or more of 1-dimensional barcodes, stacked 1-dimensional barcodes, 2-dimensional barcodes, 3-dimensional barcodes, and a data matrix.

The present invention also provides a substrate which comprises (e.g., carries on a surface thereof) the marking of the present invention as set forth above, including the various aspects thereof.

In one aspect of the substrate, the marking may serve as at least one of a security element, an authenticity element, an identification element, and a tracking and tracing element.

In another aspect, the substrate may be, or comprise, at least one of an identity document, a label, packaging, a banknote, a security document, a passport, a stamp, an ink-transfer film, and a reflective film.

The present invention also provides a security ink that comprises (i) one or more nematic compounds A and (ii) one or more chiral dopant compounds B which are capable of giving rise to a cholesteric state of the security ink upon application of heat thereto.

In one aspect, the security ink may comprise at least one chiral dopant compound B of formula (I) as set forth above.

The present invention also provides a method of providing a substrate with a liquid crystal polymer marking. The method comprises:
(i) applying a first chiral liquid crystal precursor composition onto at least one surface of a (solid) substrate;
(ii) heating the applied composition to bring same to a first chiral liquid crystal state;
(iii) applying to one or more areas of the applied composition at least one of:
   (1) at least one modifying composition which modifies the first chiral liquid crystal state locally in the one or more areas, and
   (2) at least one modifying composition which upon heating modifies the first chiral liquid crystal state locally in the one or more areas;
(iv) in the case of (2), heating at least one of the one or more areas to bring same to at least one of a second chiral liquid crystal state and an isotropic state; and
(v) at least one of curing and polymerizing the thus locally modified precursor composition to convert same into a liquid crystal polymer marking.

The present invention also provides a substrate which comprises a marking (e.g., on at least one (outer) surface thereof). The marking comprises a layer or film of a chiral liquid crystal polymer. The layer or film comprises in at least one area (region) thereof a liquid crystal polymer that has at least one optical property which is different from an optical property of the remainder of the layer or film.

In one aspect of the substrate, the liquid crystal polymer in the at least one area of the layer or film may comprise (e.g., may be in) an isotropic state. In another aspect, the liquid crystal polymer in the at least one area of the layer or film may comprise (e.g., may be in) an isotropic state.

The present invention also provides a substrate which comprises a marking (e.g., on at least one (outer) surface thereof). The marking comprises a layer or film of a first chiral liquid crystal polymer that has a first optical property. The layer or film comprises in at least one area (region) thereof a second liquid crystal polymer that has at least one second optical property which is different from the first optical property.

The present invention also provides a substrate which comprises a marking (e.g., on at least one (outer) surface thereof). The marking comprises a layer or film of a chiral liquid crystal polymer in a first chiral liquid crystal state. The layer or film comprises in at least one area (region) thereof a liquid crystal polymer in a second chiral liquid crystal state that has at least one optical property which is different from an optical property of the polymer in the first chiral liquid crystal state.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
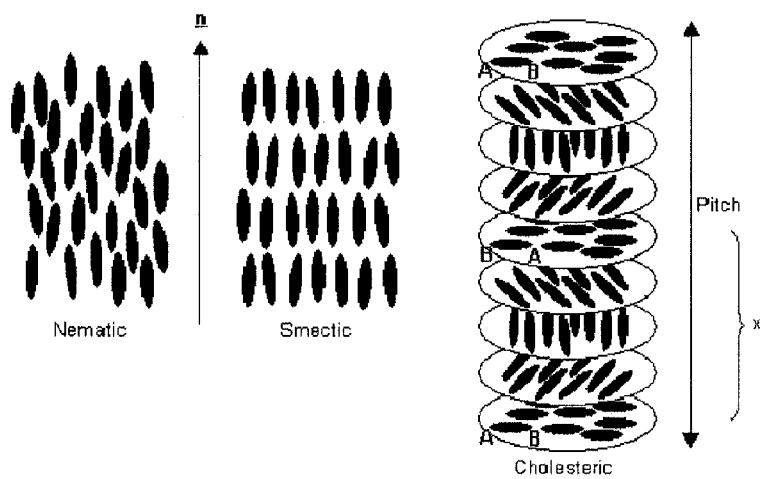
FIG. 1 is a schematic drawing which illustrates nematic, smectic and cholesteric liquid crystals.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can for holding various items such as, e.g., beverages or foodstuffs), optical fibers, a woven, a coating, and equivalents thereof, a plastic material, glass (for example, in the form of a container such as a bottle for holding various items such as, e.g., beverages or foodstuffs), cardboard, packaging, paper, and a polymeric material. It is pointed out that these substrate materials are given exclusively for exemplifying purposes, without restricting the scope of the invention. The substrate will preferably have a limited porosity (and may, for example, be substantially non-porous).

The substrate further will advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can always be identified with the help of a circular polarization filter because it selectively reflects only one of the two possible circular polarized light components, in accordance with its chiral helical structure.

Non-limiting examples of suitable substrates include: cardboard darkened with black gravure ink (no overprinted varnish); cardboard darkened with black offset ink (no overprinted varnish); cardboard darkened with any black ink and overprinted with water based varnish; cardboard darkened with any black ink and overprinted with solvent varnish; metal treated with black coating. In general, any (preferably non-porous and preferably black) substrate (which may not necessarily be flat and may be uneven) whose coating is not soluble, or only slightly soluble, in the solvent(s) used in the chiral liquid precursor composition and in the modifying agent is a suitable substrate for the purposes of the present invention.

The chiral liquid crystal precursor composition that is used for making the marking according to the present invention and is applied (e.g., deposited) onto at least a part of at least one surface of the substrate comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formula (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

It is preferred for the one or more nematic compounds A (and also the one or more chiral dopant compounds B) for use in the present invention to be substantially free of compounds which do not comprise any polymerizable group (i.e., to preferably comprise compounds without any polymerizable group merely as impurities, if at all). It also is preferred for the nematic compounds to be different from cellulose derivatives.

The one or more cholesteric (i.e., chiral dopant) compounds B for use in the chiral liquid crystal precursor composition (and also one or more chiral dopant compounds in a chiral dopant composition used as modifying composition) preferably comprise at least one polymerizable group.

As set forth above, suitable examples of the one or more chiral dopant compounds B (and also the one or more chiral dopant compounds in a chiral dopant composition used as modifying composition) include those of formula (I):

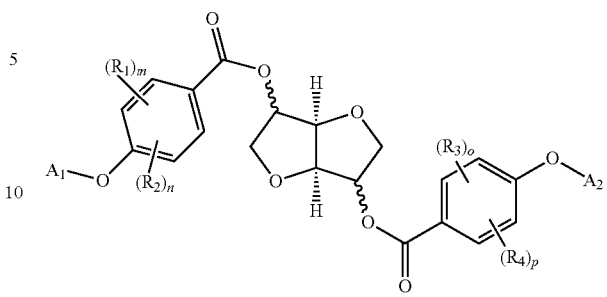

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):
(i) —[(CH$_2$)$_y$—O]$_z$—C(O)—CH=CH$_2$;
(ii) —C(O)-D$_1$-O—[(CH$_2$)$_y$—O]$_z$—C(O)—CH=CH$_2$;
(iii) —C(O)-D$_2$-O—[(CH$_2$)$_y$—O]$_z$—C(O)—CH=CH$_2$;
$D_1$ denotes a group of formula

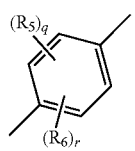

$D_2$ denotes a group of formula

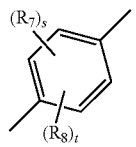

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one aspect, the one or more chiral dopant compounds B (and also the one or more chiral dopant compounds in a chiral dopant composition used as modifying composition) may comprise one or more isomannide derivatives of formula (IA):

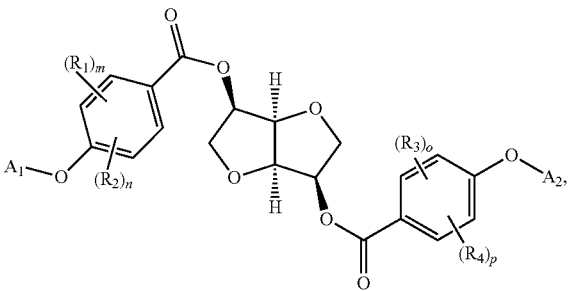

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

(i) —[(CH$_2$)y—O]z—C(O)—CH=CH$_2$;
(ii) —C(O)-D$_1$-O—[(CH$_2$)y—O]z—C(O)—CH=CH$_2$;
(iii) —C(O)-D$_2$-O—[(CH$_2$)y—O]x-C(O)—CH=CH$_2$;

$D_1$ denotes a group of formula

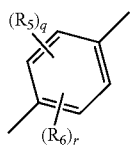

$D_2$ denotes a group of formula

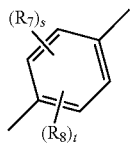

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=C$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$—O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B (and also the one or more chiral dopant compounds in a chiral dopant composition used as modifying composition) may comprise one or more isosorbide derivatives represented by formula (IB):

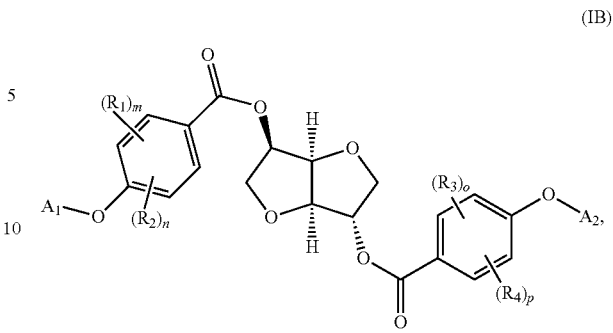

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

(i) —[(CH$_2$)y—O]z—C(O)—CH=CH$_2$;
(ii) —C(O)-D$_1$-O—[(CH$_2$)y—O]z—C(O)—CH=CH$_2$;
(iii) —C(O)-D$_2$-O—[(CH$_2$)y—O]z—C(O)—CH=CH$_2$;

$D_1$ denotes a group of formula

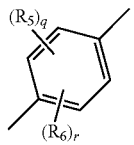

$D_2$ denotes a group of formula

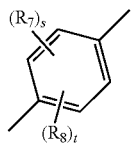

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkoxy.

In a preferred embodiment, the alkyl and alkoxy groups of R$_1$, R$_2$, R$_3$, R$_4$, R$_5$, R$_6$, R$_7$ and R$_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Example below.

The one or more chiral dopant compounds B will usually be present in the precursor composition in a total concentration of from about 0.1% to about 30% by weight, e.g., from about 0.1% to about 25%, or from about 0.1% to about 20% by weight, based on the total weight of the composition. The best results will often be obtained with concentrations of from 3% to 10% by weight, e.g., from 5% to 8% by weight, based on the total weight of the precursor composition. The one or more nematic compounds A will often be present in a concentration of from about 30% to about 50% by weight, based on the total weight of the precursor composition.

In the marking according to the present invention the application (e.g., deposition) of the precursor composition is preferably carried out with a printing technique, and in particular, a printing technique selected from at least one of continuous ink-jet printing, drop-on-demand ink-jet printing, and spray coating. Of course, other printing techniques known by those skilled in the art of printing may be used as well. In a preferred embodiment ink-jet printing is employed. The industrial ink-jet printers, commonly used for numbering, coding and marking applications on conditioning lines and printing presses, are particularly suitable. Preferred ink-jet printers include single nozzle continuous ink-jet printers (also called raster or multi level deflected printers) and drop-on-demand ink-jet printers, in particular valve-jet printers. The thickness of the applied precursor composition will usually be from about 3 to about 20 μm, e.g., from about 5 to about 15 μm.

In particular if the precursor composition is to be applied by the printing techniques set forth above, for example, by ink-jet printing, the composition will usually comprise a solvent to adjust its viscosity to a value which is suitable for the employed application (printing) technique. Typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof.

Further, in particular if the precursor composition is to be applied by continuous ink-jet printing, the precursor composition for use in the present invention will usually also comprise at least one conductivity agent (for example, a salt). The conductivity agent will have a non-negligible solubility in the composition. Non-limiting examples of suitable conductivity agents include salts such as, e.g., tetraalkyl ammonium salts (e.g., tetrabutyl ammonium nitrate, tetrabutyl ammonium perchlorate and tetrabutyl ammonium hexafluorophosphate), alkali metal thiocyanates such as potassium thiocyanate and alkali metal perchlorates such as lithium perchlorate. The conductivity agent will be present in a concentration which is sufficient to provide the conductivity which is required or desirable. Of course, mixtures of two or more different conductivity agents (salts) can be used.

If the chiral liquid crystal precursor composition for use in the present invention is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The chiral liquid crystal precursor composition for use in the present invention may also comprise a variety of other optional components which are suitable and/or desirable for achieving a particular desired property of the composition and in general, may comprise any components/substances which do not adversely affect a required property of the precursor composition to any significant extent. Non-limiting examples of such optional components are resins, silane compounds, sensitizers for the photoinitiators (if present), etc. For example, the composition may comprise one or more silane compounds which show a non-negligible solubility in the composition. Non-limiting examples of suitable silane compounds include optionally polymerizable silanes such as those of formula R$_1$R$_2$R$_3$—Si—R$_4$ wherein R$_1$, R$_2$, and R$_3$ independently represent alkoxy and alkoxyalkoxy having a total of from 1 to about 6 carbon atoms and R$_4$ represents vinyl, allyl, (C$_{1-10}$)alkyl, (meth)acryloxy(C$_{1-6}$)alkyl, and glycidyloxy(C$_{1-6}$)alkyl such as, e.g., vinyltriethoxysilane, vinyltrimethoxysilane, vinyltris(2-methoxyethoxy)silane, 3-methacryloxypropyl-trimethoxysilane, octyltri-ethoxysilane, and 3-glycidyloxypropyl triethoxysilane from the Dynasylan® family supplied by Evonik.

The concentration of the one or more silane compounds, if present, in the precursor composition will usually be from about 0.5% to about 5% by weight, based on the total weight of the composition.

Following the application (e.g., deposition) of the chiral liquid crystal precursor composition according to the invention onto the substrate the precursor composition is brought to a first chiral liquid crystal state having specific optical properties. To that end the chiral liquid crystal precursor composition is heated, the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp. The required heating time depends on several factors such as, e.g., the components of the precursor composition, the type of heating device and the intensity of the heating (energy output of the heating device). In many cases a heating time of from about 1 second to about 30 seconds such as, e.g., not more than about 20 seconds, not more than about 10 seconds, or not more than about 5 seconds will be sufficient.

The term "specific optical properties" is to be understood as a liquid crystal state with a specific pitch that reflects a specific wavelength range. An advantage of the precursor composition which contains a chiral dopant compound according to formula (I) and related formulae is the ability to generate a stable liquid crystal state quickly after the heating (and evaporation of the solvent). In contrast, the liquid crystal states which are obtained after heating and evaporation of the solvent with precursor compositions of the prior art (see, e.g., EP 1 299 375, EP 1 669 431, and EP 1 339 812, the entire disclosures of which are incorporated by reference herein) very often can easily be disrupted by minor temperature changes. Therefore, to maintain the stability of the liquid crystal state it is necessary in the latter case to freeze or fix the liquid crystal state by means of an at least partial curing or polymerization process. As previously mentioned, when the liquid crystal state is frozen or fixed the creation of a code or a marking inside the marking becomes harder. In contrast, in the process for making a marking according to the present invention no curing/polymerization of components of the precursor composition is carried out prior to stage (v). In other words, a curing/polymerization process is carried out only after the chiral liquid crystal state of the composition has been locally modified by the chiral dopant composition.

Following the application of the chiral liquid crystal precursor composition and the formation of a first chiral liquid crystal state (which can be in the form of, e.g., a layer, a pattern or a film) a (at least one) modifying composition is applied onto one or more regions of the applied composition in the first chiral liquid crystal state. The modifying composition is capable of changing the first chiral liquid crystal state (optionally upon heating, depending on the type of modifying composition). The modifying composition may be applied while the chiral liquid crystal precursor composition is still in a heated state (e.g., immediately following the completion of the heating operation) or may be applied after the chiral liquid crystal precursor composition has cooled down to at least some extent (e.g., is at substantially room temperature). If desired, the cooling of the precursor composition can be accelerated by means known to those of skill in the art such as, e.g., by blowing ambient air onto the previously heated composition. Applying the modifying composition to the precursor composition in a cooled-down state may improve the resolution of the marking. On the other hand, applying the modifying composition immediately after completion of the heating operation may be desirable if the entire process of making the marking is to be conducted in an as simple and speedy as possible manner.

The modifying composition for use in the present invention will not extract any of the compounds which form the chiral liquid crystal state and will also not modify the chemical structure of these compounds to any significant extent (and preferably, not at all). Without wishing to be bound by any theory, it is speculated that the modifying composition will initiate a very localized and controlled reorganization of the liquid crystal state. In this regard, it should be noted that the method of the present invention is fast and easy to implement industrially, and does not require complex means.

In the marking according to the present invention the modifying composition depending on its nature will usually modify the first chiral liquid crystal state from a (predominantly or substantially) anisotropic state which is characterized by specific optical properties to:
(i) a (predominantly or substantially) isotropic liquid crystal state where the color shifting properties of the liquid crystal state are substantially absent and/or no longer detectable with the unaided eye, or
(ii) a second chiral liquid crystal state with at least one optical property that is different from a corresponding optical property of the first chiral liquid crystal state.

The modifying composition may, for example, be or comprise a modifying agent. The modifying agent will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, ethyl acetate, dimethyl formamide, dimethyl sulfoxide, nitrobenzene, nitrotoluene, and mixtures of two or more thereof. Preferred compounds for use in the modifying agent include acetone, methyl ethyl ketone and ethyl acetate.

A modifying agent for use in the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g., DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evonik. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from about 3% to about 15% by weight, based on the total weight of the modifying agent.

The modifying agent may further comprise one or more conductivity agents such as, e.g., salts which are to impart sufficient conductivity to the modifying agent so as to allow its use in combination with a printer such as, e.g., a continuous ink-jet printer. Examples of suitable conductivity agents include those which are set forth above as examples of conductivity agents for use in the precursor composition of the present invention such as, e.g., tetrabutyl ammonium nitrate, tetrabutyl ammonium perchlorate, tetrabutyl ammonium hexafluorophosphate, potassium thiocyanate, lithium perchlorate and other conductivity agents known in the art.

When the modifying agent comprises a solvent or a solvent mixture, after the evaporation of the solvent the first chiral liquid crystal state will locally (in one or more region(s)) switch from a (predominantly or substantially) anisotropic state to a (predominantly or substantially) isotropic state.

In another embodiment of the present invention the modifying composition may be or comprise a second chiral liquid crystal precursor composition. The second chiral liquid crystal precursor composition which is applied in one or more areas on the first chiral liquid crystal precursor composition in the first chiral liquid crystal state may be the same as or different from the first chiral liquid crystal precursor composition. Further, everything that is set forth above with respect to the first chiral liquid precursor composition (e.g., components, application methods, etc.) applies equally and without exception also to the second chiral liquid precursor composition. For example, as in the case of the first chiral liquid crystal precursor composition the one or more chiral dopant compounds B will usually be present in the second chiral liquid crystal precursor composition in a total concentration of from about 0.1% to about 30% by weight, e.g., from about 0.1% to about 25%, or from about 0.1% to about 20% by weight, based on the total weight of the second composition. Also, the one or more nematic compounds A will often be present in the second chiral liquid crystal precursor composition in a concentration of from about 30% to about 50% by weight, based on the total weight of the second precursor composition.

If the second chiral liquid crystal precursor composition is different from the first chiral liquid crystal precursor composition the one or more differences may relate to, e.g., one or more of the compounds A and B that are present in these compositions and/or to the concentrations of one or more of these compounds. For example, a or the only difference between these compositions may be that one or more (or all) of the chiral dopant compounds B are present in the second composition in a concentration/concentrations that is/are different from the corresponding concentration/concentrations in the first composition. Further, a or the only difference between the first and second compositions may be that the one or more chiral dopant compounds B in the first composition are of formula (I) above and/or related formulae and at least one of the one or more chiral dopant compounds B in the second composition is different from formula (I) and/or related formulae. For example, at least one of the one or more chiral dopant compounds B in the second composition may be an isosorbide or isomannide derivative as described in, e.g., EP-B-0 847 432, GB-A-2 330 139, and U.S. Pat. No. 6,589,445, the entire disclosures of which are incorporated by reference herein.

After the application (e.g. deposition) of the second chiral liquid crystal precursor composition to one or more areas of the first chiral liquid crystal precursor composition in the first chiral liquid crystal state having first specific optical properties, the second precursor composition is brought to a second chiral liquid crystal state having second specific optical properties. To that end at least a part of the one or more areas onto which the second chiral liquid crystal precursor composition has been applied is heated, the solvent contained in the composition, if present, is evaporated and the promotion of the desired second chiral liquid crystal state takes place. The temperature used to evaporate the solvent and to promote the formation of the second liquid crystal state depends on the components of the second chiral liquid crystal precursor composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp.

It is to be appreciated that in the case of using a second chiral liquid crystal precursor composition as modifying composition the marking according to the present invention is not identical or comparable to a simple superposition of two chiral nematic liquid crystal layers. This constitutes a significant difference and a great advantage over the existing prior art. In particular, when the first chiral liquid crystal precursor composition is deposited on a substrate and brought to the first chiral liquid crystal state this state is characterized by a pitch p1. Likewise, when the second chiral liquid crystal precursor composition is deposited on one or more areas of the applied first composition and brought to the second chiral liquid crystal state the second state is characterized by a pitch p2 (which may be the same or different from p1). In this regard, it is pointed out that the product that is obtained after stage (iv) and further cured/polymerized in stage (v) of the process of the present invention is not a superposition of a first chiral liquid crystal state having a pitch p1 and a second chiral liquid crystal state having a pitch p2. Rather, an area carrying the second chiral liquid crystal precursor composition, once brought to the second chiral liquid crystal state, has a pitch p2' which is different from p1 and p2 but it is somewhat dependent on the nature of p1. Without wishing to be bound by any theory it is speculated that the first chiral liquid crystal state has an impact on the formation of the second chiral liquid crystal state. The induction of the first chiral liquid crystal state on the second chiral liquid crystal precursor composition will accelerate and promote a second chiral liquid crystal state which is different from the chiral liquid crystal state that would be expected based solely on the second chiral liquid crystal precursor composition alone. This constitutes a significant difference and a great advantage over the existing prior art which discloses the mere superposition of two differents layers of two different chiral liquid crystal states as a marking or coding.

The marking according to the present invention is controlled by the first chiral liquid crystal precursor composition which is only known by the producer of the marking. From different first chiral liquid crystal precursor compositions a large number of specific markings and codings can be generated and stored in a specific database which contains all of the markings or codings produced. Without wishing to be bound by any theory it is speculated that the second precursor composition will initiate a very local and controlled reorganization of the first chiral liquid crystal state. It further is to be noted that the method of the present invention is fast and easy to implement industrially, and does not require complex means.

In yet another embodiment of the present invention the modifying composition may be or comprise a chiral dopant composition. The chiral dopant composition preferably comprises one or more (e.g., one, two, three or four) chiral dopant compounds C of formula (I) set forth above and/or related formulae. In a more preferred embodiment the chiral dopant composition comprises at least one chiral dopant compound C and at least one other chiral dopant D which is different from a compound of formula (I) and related formulae. The at least one chiral dopant compound D may be selected, for example, from the derivatives of isosorbides and isomannides which are disclosed in, e.g., EP-B-0 847 432, GB-A-2 330 139, and U.S. Pat. No. 6,589,445, the entire disclosures of which are incorporated by reference herein.

As chiral dopant compounds C which are preferably present in the chiral dopant composition the chiral dopant compounds B set forth above may, for example, be used. Accordingly, everything that is set forth above with respect to compounds B applies equally and without exception also to compounds C. Also, it is to be appreciated that a (or the only) chiral dopant compound C that is present in the chiral dopant composition may be identical to a (or the only) chiral dopant compound B that is present in the chiral liquid crystal precursor composition.

The chiral dopant composition will usually comprise the one or more chiral dopant compounds in a total concentration of from about 0.1% to about 30% by weight, e.g., from about 0.1% to about 25%, or from about 0.1% to about 20% by weight, based on the total weight of the composition. Often, the total concentration will be from 3% to 10% by weight, e.g., from 5% to 8% by weight, based on the total weight of the precursor composition.

In particular if the chiral dopant composition is to be applied by the printing techniques set forth above, for example, by ink jet printing, the composition will usually comprise a solvent to adjust its viscosity to a value which is suitable for the employed application (printing) technique. Typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof. Others suitable components needed for printing techniques used in the context of the present invention may also be present (resins, salts, etc.) and are known to those of skilled in the art. For example, the chiral dopant composition may comprise one or more conductivity agents such as, e.g., salts which are to impart sufficient conductivity to the chiral dopant composition so as to allow its use in combination with a printer such as, e.g., a continuous ink-jet printer. Examples of suitable conductivity agents include those which are set forth above as examples of conductivity agents for use in the precursor composition of the present invention such as, e.g., tetrabutyl ammonium nitrate, tetrabutyl ammonium perchlorate, tetrabutyl ammonium hexafluorophosphate, potassium thiocyanate, lithium perchlorate and other conductivity agents known in the art.

After the application of the chiral dopant composition to one or more areas of the chiral liquid crystal precursor composition in the first chiral liquid crystal state having first specific optical properties, at least one of the one or more areas is brought to a second chiral liquid crystal state having second specific optical properties. To that end at least a part of the one or more areas onto which the chiral dopant composition has been applied is heated, the solvent contained in the composition, if present, is evaporated and the promotion of the desired second chiral liquid crystal state takes place. The temperature used to evaporate the solvent and to promote the formation of the second liquid crystal state depends on, e.g., the components of chiral dopant composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp.

In the marking according to the present invention the deposition of the modifying composition is performed onto one or more regions of the chiral liquid crystal precursor composition in the first liquid crystal state preferably with a printing technique and in particular, a technique selected from continuous ink-jet printing, drop-on-demand ink-jet printing, valve-jet printing and spray coating. The advantage, in particular compared to the prior art using lasers or extracting agents on polymerized or partially polymerized liquid crystals is the speed and ease of the formation of the marking, which is generated in almost real time. Another advantage of using the above printing techniques is the precision and the stability of the marking created inside the chiral liquid crystal state. Another advantage of using this printing technique is the nearly unlimited possibilities of marking which can be created and varied in almost real time. In a preferred embodiment ink-jet techniques are used for applying the modifying composition. The industrial ink-jet printers, commonly used for numbering and coding and marking applications on conditioning lines and printing presses, are particularly suitable. Preferred ink-jet printers are single nozzle continuous ink-jet printers (also called raster or multi level deflected printers) and drop-on-demand ink-jet printers, in particular valve-jet printers.

In order to enhance the resolution of the applied marking it will often be advantageous if immediately after the application of a modifying composition to one or more regions of the applied chiral liquid crystal precursor composition a stream of air is passed over the surface of the precursor composition, preferably (substantially) parallel thereto. The stream of air can be generated by any means, e.g., with an industrial hair dryer. The stream of air will preferably not be intense and/or of high speed. The temperature of the air will usually be ambient (e.g., about 20° C.) but may also be somewhat lower or higher, e.g., up to about 60° C., up to about 40° C., or up to about 30° C. The phrase "immediately after the application of the modifying composition" is intended to mean without delay, e.g., within a period of not more than about 10 seconds, for example, not more than about 5 seconds, not more than about 3 seconds, not more than about 2 seconds, or not more than about 1 second following the completion of the application of the modifying composition.

The area of the applied (first) precursor composition onto which the modifying composition is applied will usually be from about 0.1% to about 99.9% of the total area of the applied precursor composition. The area will often be at least about 1%, e.g., at least about 5% or at least about 10% and not higher than about 99%, e.g., not higher than about 95% or not higher than about 90% of the total area of the applied precursor composition.

Figure 2:
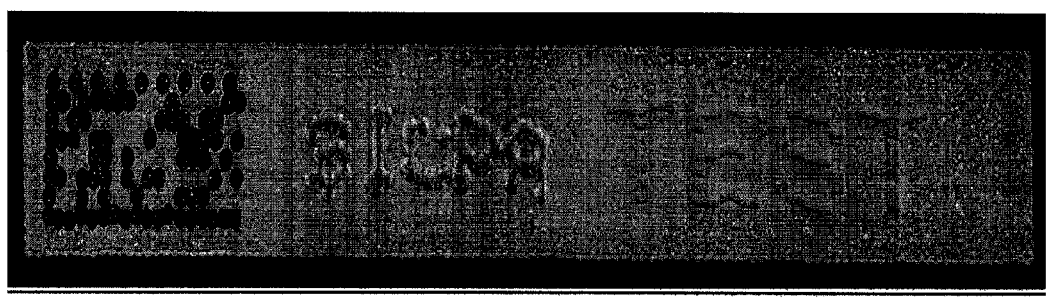
FIG. 2 shows photographs of markings in accordance with the present invention.

The marking according to the present invention may be in the form of an image, a picture, a logo, indicia, and/or a pattern representing a (1D, 2D, 3D) code such as, e.g., a 1-dimensional barcode, a stacked 1-dimensional barcode, a 2-dimensional barcode, a 3-dimensional barcode and/or a data matrix. An example of a corresponding marking is represented by FIG. 2.

It is, of course, possible to use more than one modifying composition (e.g., two, three or more different modifying compositions) and to apply them simultaneously and/or successively onto the applied (first) precursor composition (e.g., in different regions of the applied first precursor composition). Merely be way of example, the different modifying compositions may comprise two different chiral dopant compositions, or they may comprise a chiral dopant composition and a modifying agent and a second chiral liquid crystal precursor composition, or they may comprise two different second chiral liquid crystal precursor compositions and a modifying agent, or they may comprise a (at least one) modifying agent, a (at least one) second chiral liquid crystal precursor composition, and a (at least one) chiral dopant composition, etc. It also is possible, for example, to apply a first modifying composition and to thereafter apply a different second modifying composition in at least a part of the region(s) in which the initially applied first modifying composition has been applied (and, optionally, also in one or more regions where the first modifying composition has not been applied). In this regard, it further is to be appreciated that especially in cases where both a modifying agent and a second chiral liquid crystal precursor composition and/or a chiral dopant composition are employed, it may be desirable for reasons of convenience to carry out the heating of stage (iv) (which is not required for a modifying composition which modifies the first chiral liquid crystal state locally in the one or more areas such as the modifying agent) also in the case of the modifying agent. In other words, while not necessary, it is possible to (again) heat the precursor composition after the application of the modifying agent (and optionally, the passing of air over the surface of the precursor composition) to further modify the chiral liquid crystal state and/or to remove any residual solvent that was present in the modifying agent. However, in most cases an (additional) heating operation after the application of the modifying agent does not result in any significant additional advantages. If employed, the temperature used for this (optional) heating operation will in many cases range from about 55° C. to about 150° C., e.g., from about 55° C. to about 100° C., or from about 60° C. to about 100° C. Examples of suitable heating sources include conventional heating means and in particular, radiation sources such as, e.g., an IR lamp.

Especially when to or more different modifying compositions are to be employed the printing process can be carried out with a multi-head system (with, e.g., two, three, four, five or more heads) wherein each head contains a different modifying composition. An advantage of such a configuration is that during the printing process one can obtain a sequentially different modification of the first liquid crystal state and therefore a great number of unique markings. With the multi-head system one can also obtain different zones with different optical properties on the same marking, which constitute in itself a unique marking (especially when it is in the form of a data matrix). Examples of such data matrices with various multicolor data matrices are described in, e.g., WO 2008/127950 and WO 01/24106, the entire disclosures of which are incorporated by reference herein.

In order to strengthen the security of the marking according to the present invention the modifying composition may further comprise one or more pigments and/or dyes which absorb in the visible or invisible region of the electromagnetic spectrum and/or may further comprise one or more pigments and/or dyes which are luminescent. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. The presence of pigment(s) and/or dye(s) will enhance and reinforce the security of the marking against counterfeiting. Of course, in addition to the components discussed above the modifying composition for use in the present invention may comprise any other components/substances which do not adversely affect the required properties of the modifying composition to any significant extent.

The marking according to the present invention is finally obtained by curing and/or polymerizing the composition in the first chiral liquid crystal state that has been locally modified (in one or more regions) by the application of the modifying composition. The fixing or hardening is preferably performed by irradiation with UV-light, which induces polymerization of the polymerizable groups present in the precursor composition (and optionally in the modifying composition). Contrary to the prior art set forth above, the marking according to the invention is easy to implement industrially, and reliable.

Another advantage of the marking according to the present invention is that the natural random variations inherently present in the printing process according to the present invention can be used as a unique identifier ("fingerprint") which is virtually impossible to reproduce. In this regard, it is to be appreciated that even without the application of a modifying composition the cured and/or polymerized precursor composition in the chiral liquid crystal state is a marking. In other words, the modifying composition serves to generate a "marking within/on a marking".

The marking according to the present invention can be incorporated, for example, in a security feature, an authenticity feature, an identification feature or a tracking and tracing feature. An example of a security feature is an overt feature with a 3D effect.

The following examples are intended to illustrate the invention without restricting it.

EXAMPLE

A marking according to the present invention is prepared as follows:
(1) Preparation of the Chiral Liquid Crystal Precursor Composition A chiral liquid crystal precursor composition (1) was prepared as follows:
A chiral dopant compound B of formula (I) shown above, i.e., (3R,3aR,6R,6aR)-hexahydrofuro[3,2-b]furan-3,6-diyl bis (4-(4-(acryloyloxy)-3-methoxybenzoyloxy)-3-methoxybenzoate) (7.5 g), a nematic compound A1, i.e., benzoic acid, 4-[[[4-[(1-oxo-2-propen-1-yl)oxy]butoxy]carbonyl]oxy]-1,1'-(2-methyl-1,4-phenylene) ester (22.0 g), a nematic compound A2, i.e., 2-methyl-1,4-phenylene bis(4-(4-(acryloyloxy)butoxy)-benzoate) (14.0 g), and acetone (49.9 g) were weighed into a screwable flask which was thereafter heated in an oven until obtaining a brownish solution. To the mixture were then added tetrabutylammonium perchlorate (0.6 g), lithium perchlorate (0.3 g), 2-methyl-1[4-(methylthio)phenyl]-2-morpholinopropan-1-one (Irgacure 907® from Ciba, 1.3 g), 2,4-diethyl-thioxanthen-9-one (0.7 g), and vinyltriethoxysilane (3.7 g). The final mixture was then stirred or shaken until complete dissolution was achieved to result in the chiral liquid crystal precursor composition (1).

A chiral liquid crystal precursor composition (2) was prepared as follows:
A chiral dopant compound B of formula (I) shown above, i.e., (3R,3aR,6R,6aR)-6-(4-(4-(acryloyloxy)-3-methoxybenzoyloxy)-3-methoxybenzoyloxy)hexahydrofuro[3,2-b]furan-3-yl 4-(4-(acryloyloxy)benzoyloxy)-3-methoxybenzoate (9.0 g), a nematic compound A1, i.e., benzoic acid, 4-[[[4-[(1-oxo-2-propen-1-yl)oxy]butoxy]carbonyl]oxy]-1,1'-(2-methyl-1,4-phenylene) ester (16.0 g), a nematic compound A2, i.e., 2-methyl-1,4-phenylene bis(4-(4-(acryloyloxy)butoxy)-benzoate) (20.0 g), and methyl ethyl ketone (48.0 g) were weighed into a screwable flask which was thereafter heated in an oven until obtaining a brownish solution. To the mixture were then added tetrabutylammonium perchlorate (0.5 g), lithium perchlorate (0.6 g), 2-methyl-1[4-(methylthio)phenyl]-2-morpholinopropan-1-one (Irgacure 907® from Ciba, 1.2 g), 2-isopropyl-thioxanthen-9-one (0.7 g), and vinyltriethoxysilane (4.0 g). The final mixture was then stirred or shaken until complete dissolution was achieved to result in the chiral liquid crystal precursor composition (2).

(2) Deposition of the Chiral Liquid Crystal Precursor Composition on a Substrate The chiral liquid crystal precursor composition (1) or (2) was then used to print a plain pattern by continuous ink-jet printing on a paper substrate with a dark background.

(3) Bringing the Precursor Composition to the Chiral Liquid Crystal State

The (first) chiral liquid crystal state was developed from the plain pattern by exposure to an IR lamp for about 1 to 5 seconds (depending on the substrate).

(4) Applying a Modifying Composition to One or More Region(s) of Said Composition in the First Liquid Crystal State A marking or design was then printed on top of the developed pattern, with a continuous ink-jet printer with a multi-head (three heads). The printing was done sequentially with three solutions, i.e., (a), (b) and (c):

(a) a solution (in droplet form) of a resin (5 to 15% by weight) and of lithium perchlorate (0.6% by weight) in methyl ethyl ketone or acetone; this solution resulted in an isotropic state in the areas of application;
(b) an ink-jet ink which is identical with the initially applied chiral liquid crystal precursor composition (1) or (2);
(c) an ink-jet ink which was either a solution (in droplet form) of (3R,3aR,6R,6aR)-hexahydrofuro[3,2-b]furan-3,6-diyl bis(4-(4-(acryloyloxy)-3-methoxybenzoyloxy)-3-methoxy-benzoate) (5 to 20% by weight) and of lithium perchlorate (0.6% by weight) in methyl ethyl ketone or a solution (in droplet form) of (3R,3aR,6R,6aR)-6-(4-(4-(acryloyloxy)-3-methoxybenzoyloxy)-3-methoxy-benzoyloxy)hexahydrofuro[3,2-b]-furan-3-yl 4-(4-(acryloyloxy)benzoyloxy)-3-methoxy-benzoate (5 to 20% by weight) and of lithium perchlorate (0.6% by weight) in acetone.

Within about 1 second following the completion of each printing operation an air flow was streamed parallel to the printed surface.

(5) Bringing the Resulting Product to the Chiral Liquid Crystal State (in the Case of Ink-Jet Inks (b) and (c))

A modified chiral liquid crystal state in the application areas was developed by exposure of the resultant product including the marking to an IR lamp for about 1 to 5 seconds (depending on the substrate). This resulted locally in a novel anisotropic state different from the first chiral liquid crystal state.

(6) Curing or Polymerizing the Resulting Product

The resultant product with the marking printed thereon was then cured by a UV dryer with a mercury low-pressure lamp having a UV irradiance of 10 mW/cm$^2$.

An example of a marking (consisting of three different individual markings) obtained by the above procedure is shown in FIG. 2.

The following other compounds may, for example, be employed in the above-described procedure instead of the chiral dopant compound B of formula (I):

(3R,3aR,6R,6aR)-hexahydrofuro[3,2-b]furan-3,6-diyl bis(4-(4(acryloyloxy)benzoyloxy)-benzoate);

(3R,3aR,6R,6aR)-hexahydrofuro[3,2-b]furan-3,6-diyl bis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diyl bis(4-(4-(acryloyloxy)benzoyloxy)-3-methoxybenzoate);

(3R,3aR,6R,6aR)-hexahydrofuro[3,2-b]furan-3,6-diyl bis(4-(4-(acryloyloxy)-3-methoxy-benzoyloxy)benzoate);

(3R,3aR,6R,6aR)-hexahydrofuro[3,2-b]furan-3,6-diyl bis(4-(4-(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1,4:3,6-dianhydro-D-mannitol;

2,5-bis-O-(4-{[4-(acryloyloxy)-2-ethoxybenzoyl]oxy}-3-methylbenzoyl)-1,4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methylbenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol 2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

As nematic compound A 1 in the above-described procedure the following other compounds may, for example, be employed:

2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methyl-benzoate];

2-methylbenzene-1,4-diyl bis[4-({[4-(acryloyloxy)butoxy]carbonyl}oxy)-2-methyl-benzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxy-benzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxy-benzoate];

2-methoxybenzene-1,4-diyl bis[4-({[4-(acryloyloxy)butoxy]carbonyl}oxy)-3,5-di-methoxybenzoate]; and 4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate.

As nematic compound A2 in the above-described procedure the following other compounds may, for example, be employed:

4-({4-[4-(acryloyloxy)butoxy]benzoyl}oxy)-3-methylphenyl 4-[4-(acryloyloxy)butoxy]-2-methylbenzoate;
4-({4-[4-(acryloyloxy)butoxy]benzoyl}oxy)-3-methylphenyl 4-[4-(acryloyloxy)butoxy]-3-methylbenzoate;
2-methylbenzene-1,4-diyl bis{4-[4-(acryloyloxy)butoxy]-2-methylbenzoate};
4-({4-[4-(acryloyloxy)butoxy]-2-methylbenzoyl}oxy)-3-methylphenyl 4-[4-(acryloyl-oxy)butoxy]-2,5-dimethylbenzoate;
2-methylbenzene-1,4-diyl bis{4-[4-(acryloyloxy)butoxy]-2,5-dimethylbenzoate}2-methylbenzene-1,4-diyl bis{4-[4-(acryloyloxy)butoxy]benzoate};
4-({4-[4-(acryloyloxy)butoxy]-3,5-dimethylbenzoyl}oxy)-3-methylphenyl 4-[4-(acryloyloxy)butoxy]-2,5-dimethylbenzoate;
2-methylbenzene-1,4-diyl bis{4-[4-(acryloyloxy)butoxy]-3,5-dimethylbenzoate};
2-methoxybenzene-1,4-diyl bis{4-[4-(acryloyloxy)butoxy]-3,5-dimethylbenzoate};
4-({4-[4-(acryloyloxy)butoxy]-3-methylbenzoyl}oxy)-2-methoxyphenyl 4-[4-(acryloyl-oxy)butoxy]-3,5-dimethylbenzoate;
2-methoxybenzene-1,4-diyl bis{4-[4-(acryloyloxy)butoxy]-3-methylbenzoate};
4-({4-[4-(acryloyloxy)butoxy]benzoyl}oxy)-3-methoxyphenyl 4-[4-(acryloyloxy)-butoxy]-3-methylbenzoate;
4-({4-[4-(acryloyloxy)butoxy]benzoyl}oxy)-3-methoxyphenyl 4-[4-(acryloyloxy)-butoxy]-2,5-dimethylbenzoate;
2-methoxybenzene-1,4-diyl bis{4-[4-(acryloyloxy)butoxy]-2-methoxybenzoate};
2-methoxybenzene-1,4-diyl bis{4-[4-(acryloyloxy)butoxy]-3,5-dimethoxybenzoate};
2-methoxybenzene-1,4-diyl bis {4-[4-(acryloyloxy)butoxy]-3-methoxybenzoate};
2-ethoxybenzene-1,4-diyl bis{4-[4-(acryloyloxy)butoxy]benzoate};
2-ethoxybenzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]benzoate};
4-({4-[4-(acryloyloxy)butoxy]benzoyl}oxy)-2-(propan-2-yloxy)phenyl 4-[4-(acryloyl-oxy)butoxy]-2-methylbenzoate;
2-(propan-2-yloxy)benzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]-2,5-dimethyl-benzoate};
2-(propan-2-yloxy)benzene-1,4-diyl bis{4-[4-(acryloyloxy)butoxy]-3,5-dimethyl-benzoate}; and
2-(propan-2-yloxy)benzene-1,4-diyl bis{4-[4-(acryloyloxy)butoxy]-3,5-dimethoxy-benzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosures of concurrently filed U.S. patent applications entitled "CHIRAL LIQUID CRYSTAL POLYMER MARKING" application Ser. No. 12/783,078, "MARKING BASED ON MODIFIED CHIRAL LIQUID CRYSTAL POLYMERS" application Ser. No. 12/783,081, and "MARKING BASED ON CHIRAL LIQUID CRYSTAL POLYMERS" application Ser. No. 12/783,068 are expressly incorporated by reference herein.

What is claimed is:

1. A liquid crystal polymer marking, wherein the marking is obtained by a process comprising:
   (i) applying a chiral liquid crystal precursor composition onto a substrate;
   (ii) heating the applied chiral liquid crystal precursor composition to bring same to a first chiral liquid crystal state;
   (iii) applying to one or more areas of the applied composition at a first chiral liquid crystal state, the one or more areas being less than a total surface area of the applied composition at a first chiral liquid crystal state, at least one of
      (1) at least one modifying composition which modifies the first chiral liquid crystal state locally in the one or more areas, and
      (2) at least one modifying composition which upon heating modifies the first chiral liquid crystal state locally in the one or more areas;
   (iv) in the case of (2), heating at least one of the one or more areas to bring same to at least one of a second chiral liquid crystal state and an isotropic state forming a locally modified chiral liquid crystal precursor in the at least one of the one or more areas; and
   (v) at least one of curing and polymerizing the thus locally modified precursor composition to convert same into a liquid crystal polymer marking, and no curing or polymerization of components is carried out prior to the at least one of curing and polymerizing the thus modified chiral liquid crystal precursor composition.

2. The marking of claim 1, wherein the chiral liquid crystal precursor composition comprises (i) one or more nematic compounds A and (ii) one or more chiral dopant compounds B which are capable of giving rise to a cholesteric state of the chiral liquid crystal precursor composition.

3. The marking of claim 2, wherein the one or more nematic compounds A as well as the one or more chiral dopant compounds B comprise at least one compound that comprises at least one polymerizable group.

4. The marking of claim 3, wherein the at least one polymerizable group comprises an unsaturated carbon-carbon bond.

5. The marking of claim 4, wherein the at least one polymerizable group comprises a group of formula $H_2C=CH-C(O)-$.

6. The marking of claim 3, wherein the chiral liquid crystal precursor composition comprises at least one chiral dopant compound B of formula (I):

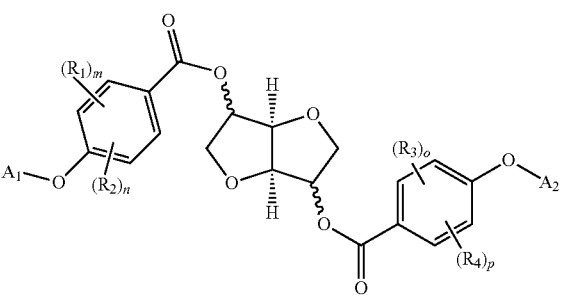

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

(i) —[(CH$_2$)y-O]$_z$—C(O)—CH=CH$_2$;
(ii) —C(O)-D$_1$-O—[(CH$_2$)$_y$—O]$_z$—C(O)—CH=CH$_2$;
(iii) —C(O)-D$_2$-O—[(CH$_2$)$_y$—O]$_z$—C(O)—CH=CH$_2$;

$D_1$ denotes a group of formula

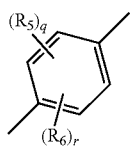

$D_2$ denotes a group of formula

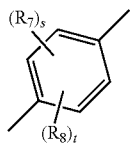

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

7. The marking of claim 1, wherein the at least one modifying composition comprises at least one compound selected from ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted nitrobenzene.

8. The marking of claim 1, wherein the at least one modifying composition comprises at least one second chiral liquid crystal precursor composition.

9. The marking of claim 1, wherein the at least one modifying composition comprises at least one chiral dopant composition.

10. The marking of claim 1, wherein the at least one modifying composition further comprises at least one of a pigment and a dye that absorbs in the visible or invisible region of the electromagnetic spectrum.

11. The marking of claim 10, wherein the at least one modifying composition further comprises at least one of a luminescent pigment and a luminescent dye.

12. The marking of claim 1, wherein (ii) comprises heating the applied composition to a temperature of from about 55° C. to about 150° C.

13. The marking of claim 1, wherein (iii) comprises applying the at least one modifying composition by at least one of continuous ink-jet printing, drop-on-demand ink-jet printing, spray coating, and valve-jet printing.

14. The marking of claim 1, wherein immediately after (iii) a stream of air is passed over the one or more areas.

15. The marking of claim 1, wherein the marking is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

16. A substrate which comprises the marking of claim 1.

17. The substrate of claim 16, wherein the marking serves the function of at least one of a security element, an authenticity element, an identification element, and a tracking and tracing element.

18. The substrate of claim 16, wherein the substrate is or comprises at least one of an identity document, a label, a packaging, a banknote, a security document, a passport, a stamp, an ink-transfer film, and a reflective film.

19. A method of providing a substrate with a liquid crystal polymer marking, wherein the method comprises:
(i) applying a chiral liquid crystal precursor composition onto a substrate;
(ii) heating the applied chiral liquid crystal precursor composition to bring same to a first chiral liquid crystal state;
(iii) applying to one or more areas of the applied composition at a first chiral liquid crystal state, the one or more areas being less than a total surface area of the applied composition at a first chiral liquid crystal state, at least one of
(1) at least one modifying composition which modifies the first chiral liquid crystal state locally in the one or more areas, and
(2) at least one modifying composition which upon heating modifies the first chiral liquid crystal state locally in the one or more areas;
(iv) in the case of (2), heating at least one of the one or more areas to bring same to at least one of a second chiral liquid crystal state and an isotropic state forming a locally modified chiral liquid crystal precursor in the at least one of the one or more areas; and
(v) at least one of curing and polymerizing the thus locally modified precursor composition to convert same into a liquid crystal polymer marking, and no curing or polymerization of components is carried out prior to the at least one of curing and polymerizing the thus modified chiral liquid crystal precursor composition.

20. The marking according to claim 1, wherein the one or more areas is less than about 99% of the total surface area of the applied composition at a first chiral liquid crystal state.

21. The marking according to claim 20, wherein the one or more areas is less than about 90% of the total surface area of the applied composition at a first chiral liquid crystal state.

22. The marking according to claim 21, wherein the one or more areas is at least about 5% of the total surface area of the applied composition at a first chiral liquid crystal state.

23. The marking according to claim 22, wherein the one or more areas is at least about 10% of the total surface area of the applied composition at a first chiral liquid crystal state.

24. The marking according to claim 1, wherein the modifying composition does not extract any of the compounds which form the chiral liquid crystal state.

25. The method according to claim 19, wherein the one or more areas is less than about 99% of the total surface area of the applied composition at a first chiral liquid crystal state.

26. The method according to claim 25, wherein the one or more areas is less than about 90% of the total surface area of the applied composition at a first chiral liquid crystal state.

27. The method according to claim 26, wherein the one or more areas is at least about 5% of the total surface area of the applied composition at a first chiral liquid crystal state.

28. The method according to claim 27, wherein the one or more areas is at least about 10% of the total surface area of the applied composition at a first chiral liquid crystal state.

29. The method according to claim 1, wherein the modifying composition does not extract any of the compounds which form the chiral liquid crystal state.

30. A liquid crystal polymer marking, wherein the marking is obtained by a process comprising:
(i) applying a chiral liquid crystal precursor composition onto a substrate;
(ii) heating the applied chiral liquid crystal precursor composition to bring same to a first chiral liquid crystal state;
(iii) applying to one or more areas of the applied composition at a first chiral liquid crystal state, the one or more areas being less than a total surface area of the applied composition at a first chiral liquid crystal state, at least one of
(1) at least one modifying composition which modifies the first chiral liquid crystal state locally in the one or more areas, and
(2) at least one modifying composition which upon heating modifies the first chiral liquid crystal state locally in the one or more areas;
(iv) in the case of (2), heating at least one of the one or more areas to bring same to at least one of a second chiral liquid crystal state and an isotropic state forming a locally modified chiral liquid crystal precursor in the at least one of the one or more areas; and
(v) at least one of curing and polymerizing the thus locally modified precursor composition to convert same into a liquid crystal polymer marking; and
wherein the marking is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

* * * * *